Patented June 1, 1926.

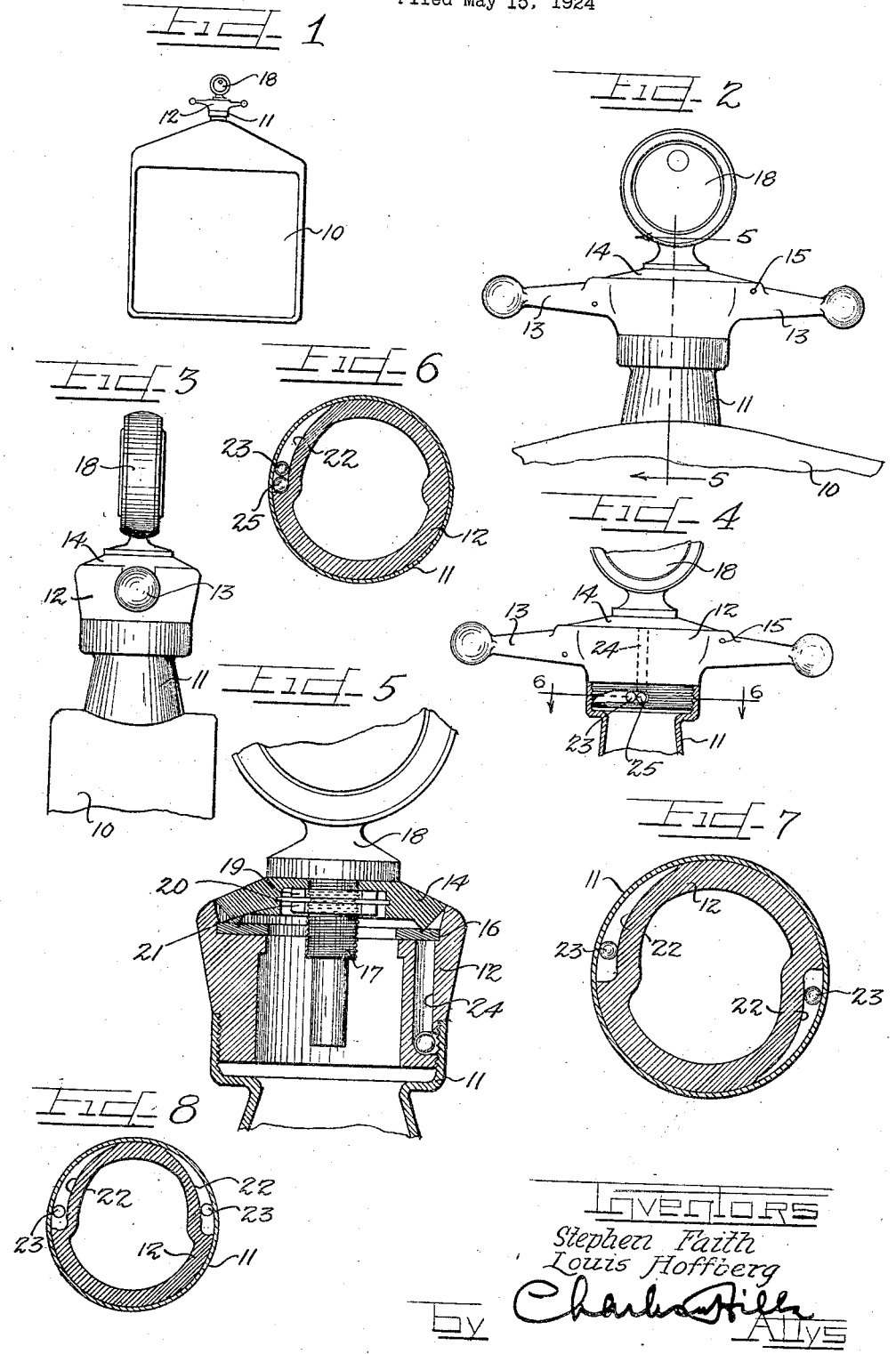

1,586,791

UNITED STATES PATENT OFFICE.

STEPHEN FAITH AND LOUIS HOFFBERG, OF CHICAGO, ILLINOIS, ASSIGNORS, BY DIRECT AND MESNE ASSIGNMENTS, OF ONE-HALF TO FAITH PRODUCTS CORPORATION, OF CHICAGO, ILLINOIS, A CORPORATION OF ILLINOIS, AND ONE-HALF TO GLOBE SPECIALTY COMPANY.

LOCKING DEVICE FOR RADIATOR CAPS AND THE LIKE.

Application filed May 15, 1924. Serial No. 713,385.

This invention relates to locking devices for radiator caps and the like.

Radiator caps, especially when they have motor meters attached thereto, are very frequently stolen from automobiles.

It is an object, therefore, of the present invention to provide locking devices for radiator caps and the like to prevent theft.

Other and further important objects of this invention will be apparent from the disclosures in the accompanying drawings and the following specification.

The invention (in a preferred form) is illustrated on the drawings and hereinafter more fully described.

On the drawings:

Figure 1 is an elevation of the radiator of an automobile with a radiator cap and motor meter attached thereto.

Figure 2 is a front elevation of the radiator cap and motor meter.

Figure 3 is a side elevation of the same.

Figure 4 is a front elevation partly in section.

Figure 5 is a section on the line 5—5 of Figure 2.

Figure 6 is a section on the line 6—6 of Figure 4.

Figure 7 is a section similar to Figure 6 of a modified form of construction.

Figure 8 is a section similar to Figures 6 and 7 of a still further form of construction.

As shown on the drawings:

The device is shown mounted on the radiator 10 of an automobile provided with the usual boss or water-filling connection 11. The particular form of boss shown is internally threaded for the reception of the cap 12, which is externally threaded at its lower portion.

Pivotally connected at 15 to one of the arms 13 of the cap is the motor meter support 14 which normally seats upon a gasket 16 of rubber or the like arranged in a recess in the cap around the central passage therethrough.

The motor meter support may be releasably held in seated position upon the cap by any suitable means, such as that shown in the copending application of Stephen Faith filed of even date herewith Serial No. 713,375. The particular form of pivotal connection between the cap and motor meter support shown in such application may also be employed to advantage to prevent detachment of the support and its attached motor meter.

The support 14 is formed with a central threaded aperture for engagement with the threaded stem 17 of the motor meter 18. A lock nut 19 is provided for holding the support 14 and stem 17 firmly together. While the lock nut 19 prevents the parts becoming separated by vibration, it will not prevent theft of the motor meter. Accordingly a steel washer 20 is placed over this lock nut. When inserted this washer is concave or dished in cross section so that when a second lock nut 21 is screwed down over the washer, the latter is flattened out, with the result that its inner and outer edges are forced into the stem 17 and support 14 respectively. The washer cannot then be removed by any ordinary means.

In order to prevent detachment of the cap 12 from the boss 11, a groove 22 is arranged around a portion of the periphery of the threaded part of the cap, as shown more particularly in Figure 6. This groove is of progressively decreasing depth so that, if a ball or roller 23 is arranged therein, the ball, as it travels clockwise along the groove by the rotation of the cap in the boss will jam and prevent further rotation. As the large end of the groove is of slightly greater depth than the diameter of the ball 23, the latter will not interfere with the rotation of the cap in the opposite direction so that the cap may be screwed home in the boss without difficulty.

While the ball may if desired be placed in the groove before the cap has been screwed into the boss, it is not always convenient to do this. Hence, we prefer to provide a vertical passage 24 in the cap leading to the large end of the groove through which the ball or roller 23 may be dropped after the cap has been screwed into place.

The walls of the cap may to advantage be thickened adjacent this passage to reduce liability of breakage.

As it would be possible after raising the support 14 and removing the gasket 16 to remove a steel ball by inserting a magnet in the passage 24, we prefer to insert behind the steel ball 23 a ball 25 of brass or other nonmagnetic material.

If it is necessary to remove the cap at any time, this can be done by detaching the radiator from the car and inverting it to allow the balls to fall out through the passage 24.

With a single groove it might be possible by a series of jarring movements, to keep the ball 23 free in its groove 22 while gradually unscrewing the cap and consequently we may use two grooves, as shown in Figure 7, so that any jarring action which would tend to loosen one ball would tend to jam the other still tighter. In Figure 8 an arrangement is shown adapted to prevent rotation of the cap in either direction.

We are aware that numerous details of construction may be varied through a wide range without departing from the principles of this construction, and we do not purpose limiting the patent granted otherwise than necessitated by the prior art.

We claim as our invention:

1. A radiator cap construction, comprising two members having relative rotary engagement with each other, and means disposed between said members for locking them against relative movement in one direction only, said means adapted to be removed by gravity when said members are shifted to an abnormal position.

2. A radiator cap construction, comprising two members having threaded engagement with each other, and means disposed between said members for locking them against relative movement in one direction only, said means adapted to be removed by gravity when said members are shifted to an abnormal position.

3. A radiator cap construction, comprising two members having threaded engagement with each other, and means disposed between said members for locking them against relative movement in one direction only, said means adapted to be removed by gravity when said members are inverted.

4. A device of the kind set forth, comprising two members having threaded engagement with each other, one of said members having a groove of progressively decreasing depth arranged circumferentially in its threaded portion and also having a vertical passage leading to the larger end of said groove, and a ball adapted to be inserted through said passage into said groove and adapted to allow said members to turn relatively to each other in one direction only.

5. A device of the kind set forth, comprising a vertically arranged internally threaded boss, an externally threaded cap therefor having a groove of progressively decreasing depth arranged circumferentially in its threaded portion and also having a vertical passage leading to the larger end of said groove, and a plurality of balls adapted to be inserted through said passage into said groove, one of said balls being of non-magnetic material, whereby the cap may be screwed into the boss but not unscrewed therefrom.

6. A device of the kind set forth, comprising two members having threaded engagement with each other, one of said members having a groove of progressively decreasing depth arranged circumferentially in its threaded portion and also having a vertical passage leading to the larger end of said groove, and a ball adapted to be inserted through said passage into said groove, whereby the members may be screwed together but not unscrewed.

7. A device of the kind set forth, comprising two members having threaded engagement with each other, one of said members having a groove of progressively decreasing depth arranged circumferentially in its threaded portion and also having a vertical passage leading to the larger end of said groove, a steel ball adapted to be inserted through said passage into said groove, and a ball of non-magnetic material adapted to be inserted in said groove after the insertion of the steel ball to prevent the withdrawal of the steel ball by means of a magnet.

8. A radiator cap construction, comprising two members having rotational engagement with each other, a groove of progressively decreasing depth being disposed circumferentially between said members, a vertical passage leading to the larger end of said groove, and a circular member arranged within said groove and adapted to allow said members to turn relatively to each other in one direction only, said vertical passage permitting the insertion of the circular member, and its removal by gravity.

9. A device of the kind set forth, comprising two members having threaded engagement with each other, a groove of progressively decreasing depth being disposed circumferentially in said threaded portion, a vertical passage leading to the larger end of said groove, and a circular member arranged within said groove and adapted to allow said members to turn relatively to each other in one direction only.

In testimony whereof we have hereunto subscribed our names.

STEPHEN FAITH.
LOUIS HOFFBERG.